No. 727,959. PATENTED MAY 12, 1903.
W. H. JOHNSON.
BENDING MACHINE.
APPLICATION FILED DEC. 12, 1901.
NO MODEL. 8 SHEETS—SHEET 1.
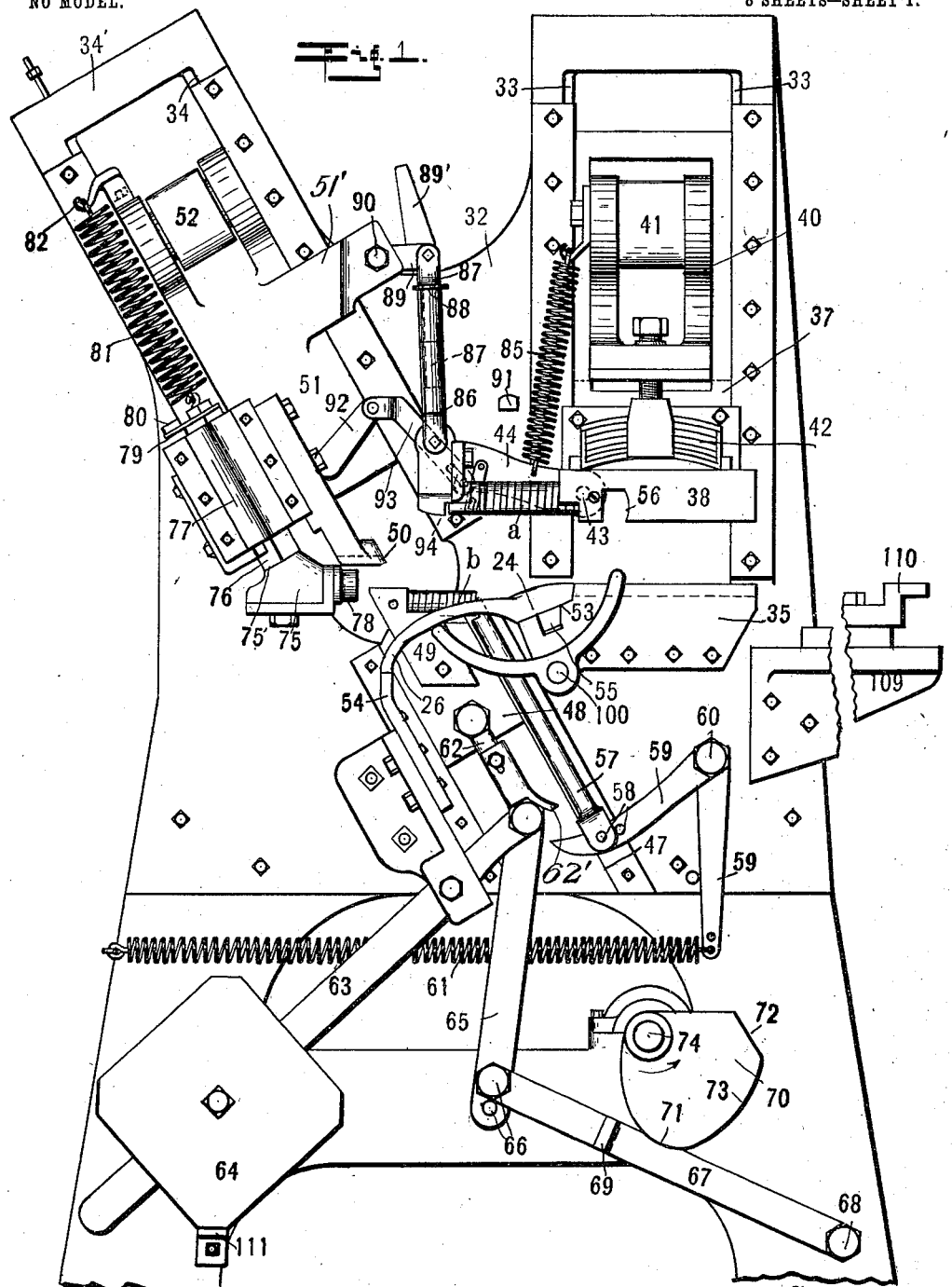

No. 727,959. PATENTED MAY 12, 1903.
W. H. JOHNSON.
BENDING MACHINE.
APPLICATION FILED DEC. 12, 1901.
NO MODEL. 8 SHEETS—SHEET 2.
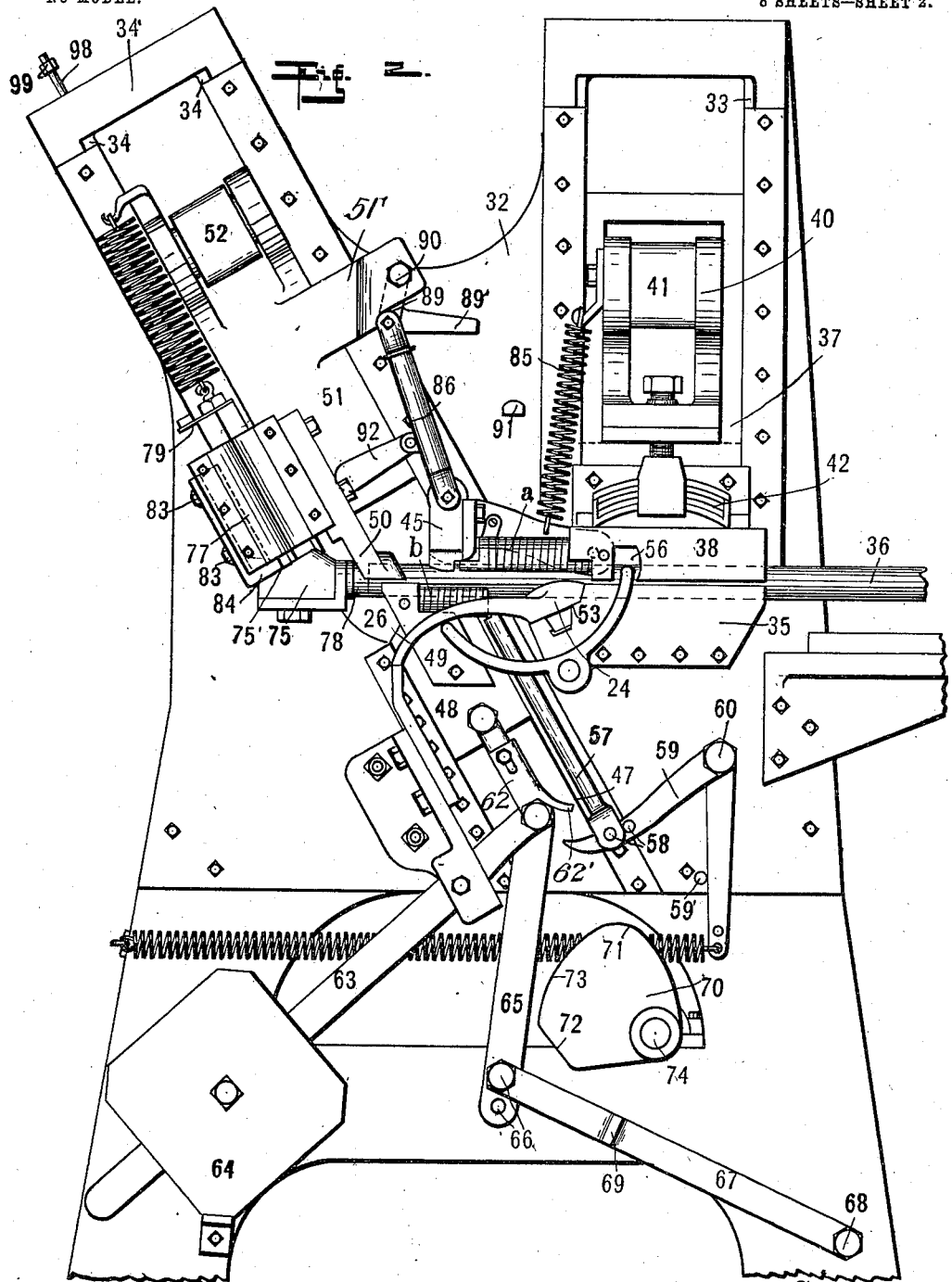
Witnesses
Frank A. Fahle
Bertha M. Ballard
Inventor
William H. Johnson
By
Arthur M. Hood
Attorney No. 727,959. PATENTED MAY 12, 1903.
W. H. JOHNSON.
BENDING MACHINE.
APPLICATION FILED DEC. 12, 1901.
NO MODEL. 8 SHEETS—SHEET 3.
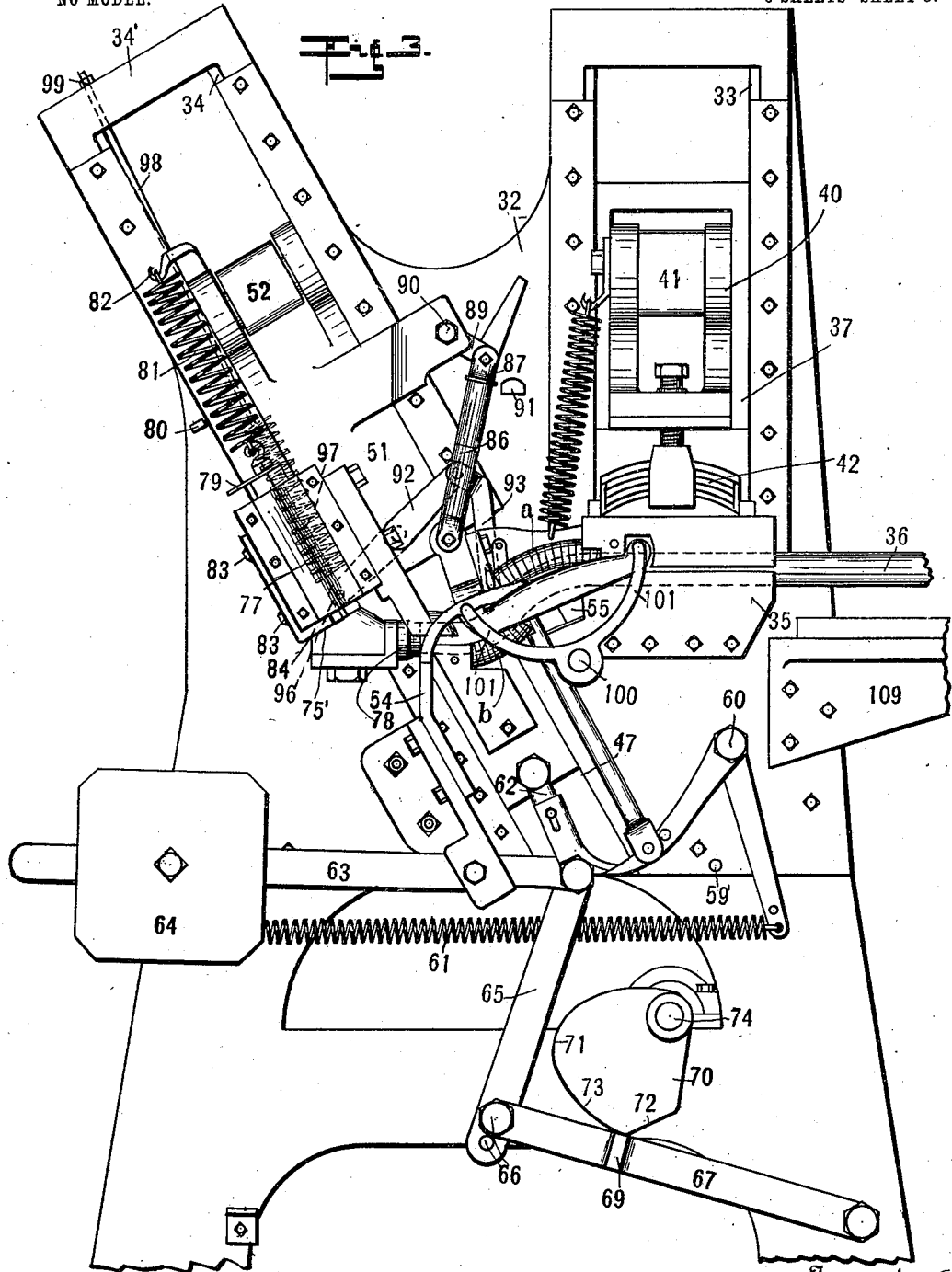

No. 727,959. PATENTED MAY 12, 1903.
W. H. JOHNSON.
BENDING MACHINE.
APPLICATION FILED DEC. 12, 1901.
NO MODEL. 8 SHEETS—SHEET 4.
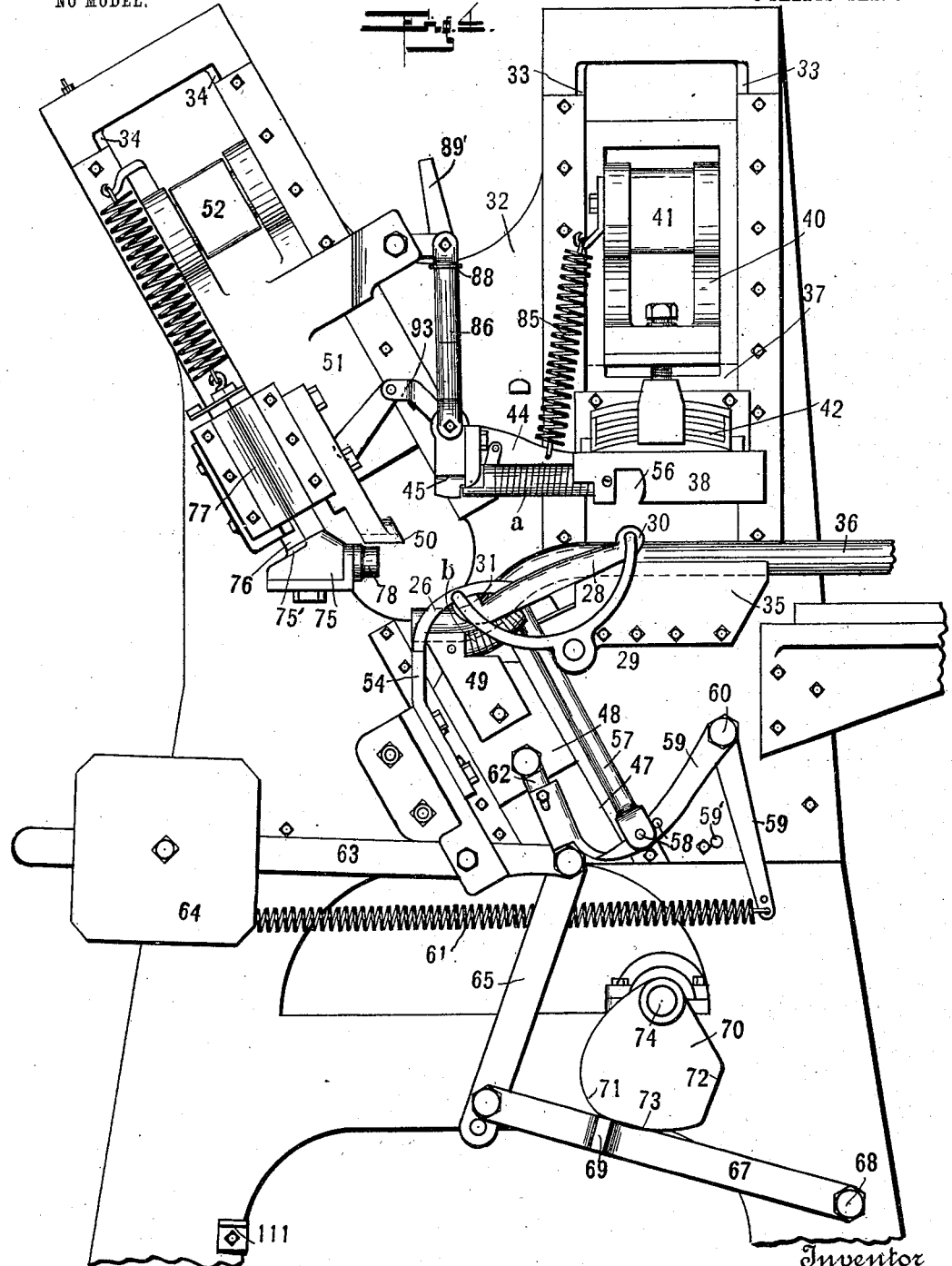

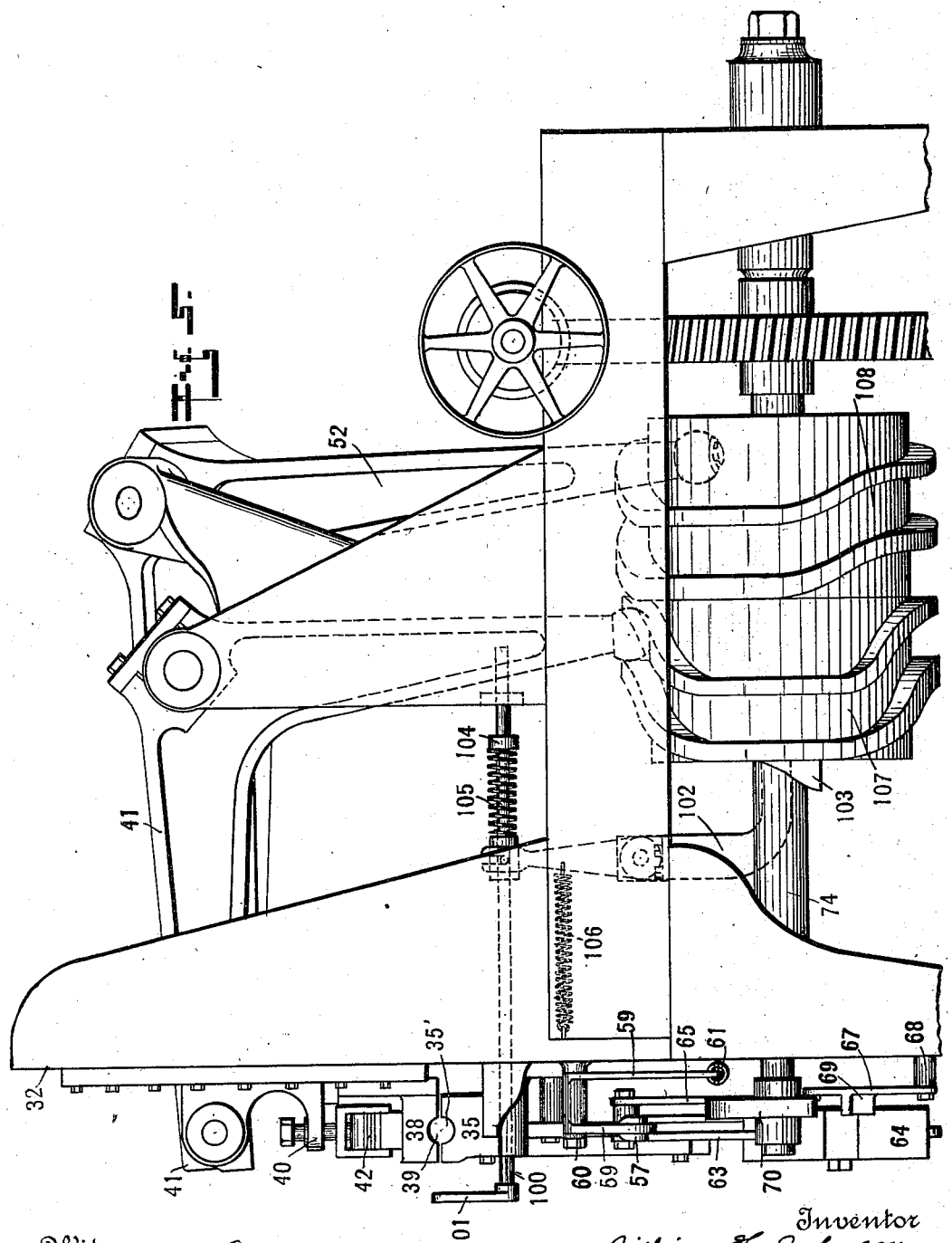

No. 727,959. PATENTED MAY 12, 1903.
W. H. JOHNSON.
BENDING MACHINE.
APPLICATION FILED DEC. 12, 1901.
NO MODEL. 8 SHEETS—SHEET 6.
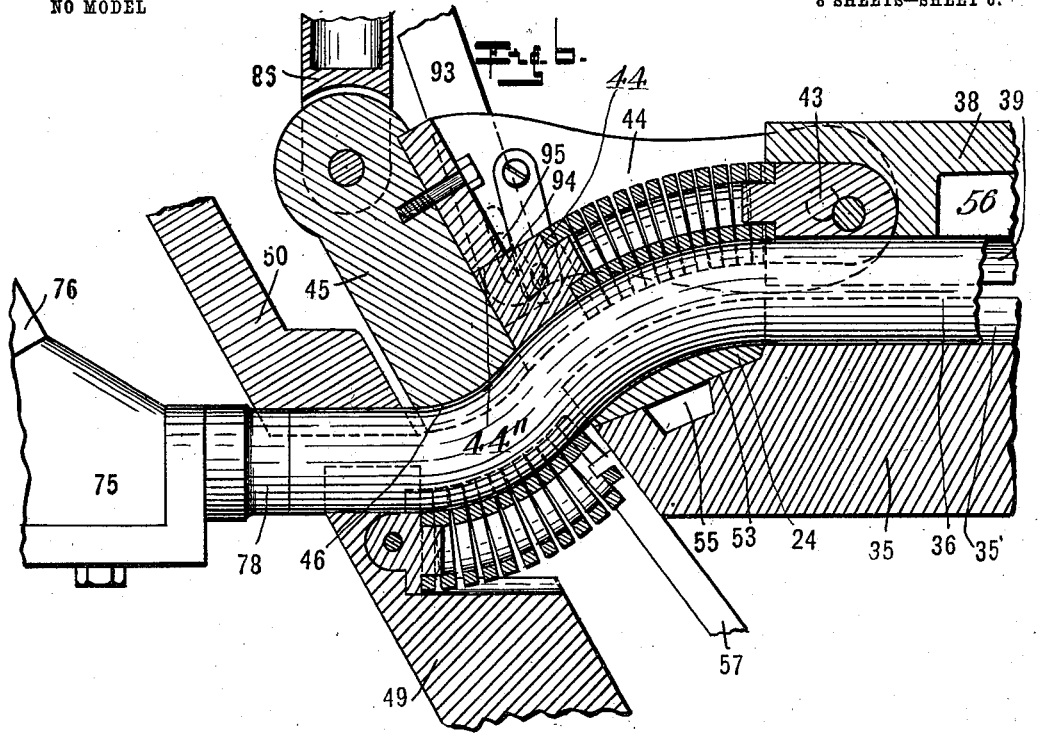
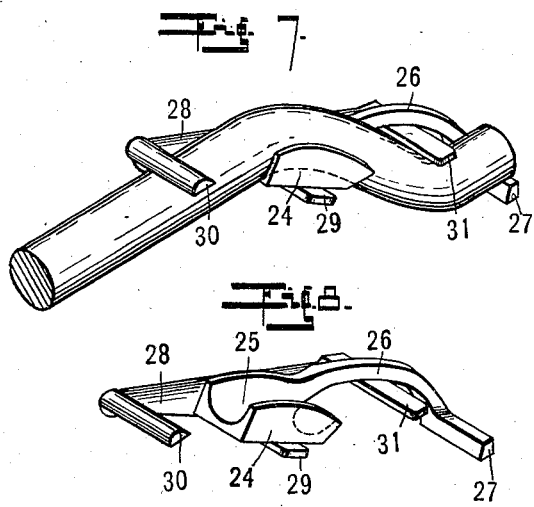
Witnesses
Frank R. Fable
Bertha M. Ballard
Inventor
William H. Johnson
By Arthur M. Hood
Attorney No. 727,959. PATENTED MAY 12, 1903.
W. H. JOHNSON.
BENDING MACHINE.
APPLICATION FILED DEC. 12, 1901.
NO MODEL. 8 SHEETS—SHEET 7.
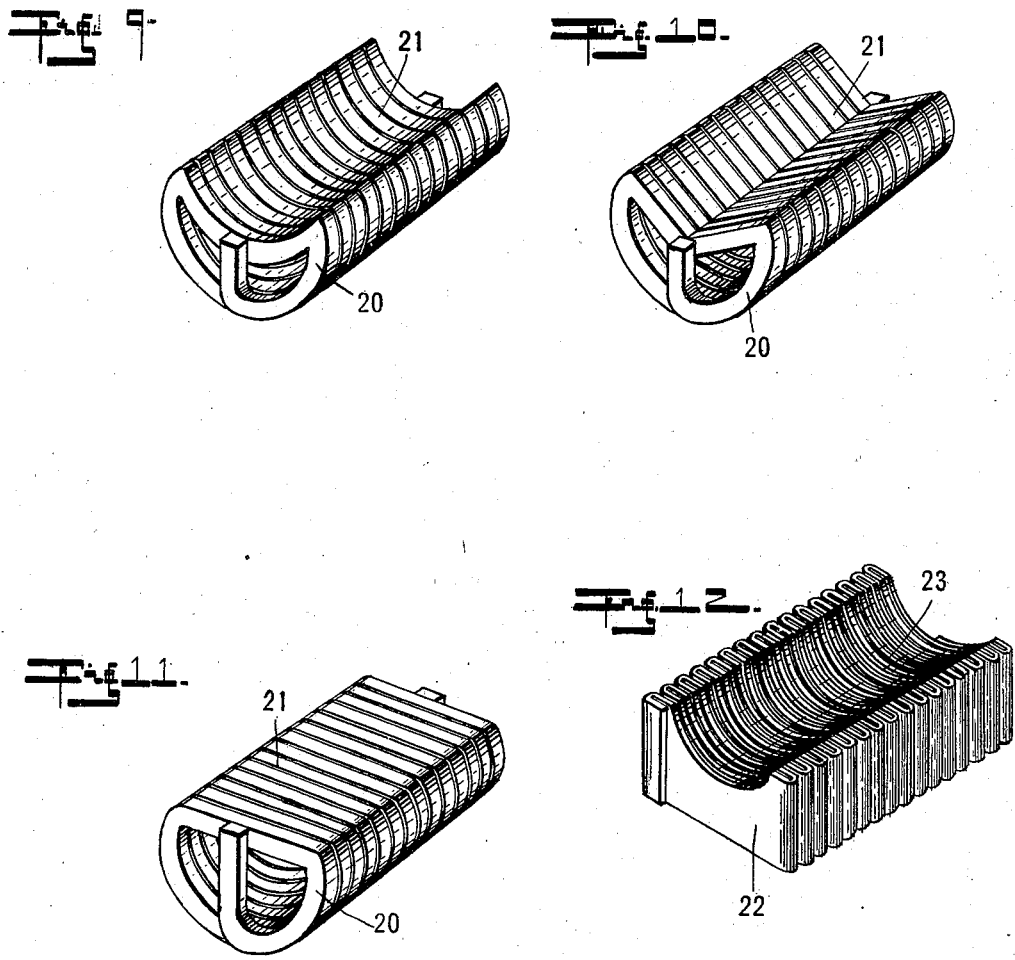

No. 727,959. PATENTED MAY 12, 1903.
W. H. JOHNSON.
BENDING MACHINE.
APPLICATION FILED DEC. 12, 1901.
NO MODEL. 8 SHEETS—SHEET 8.
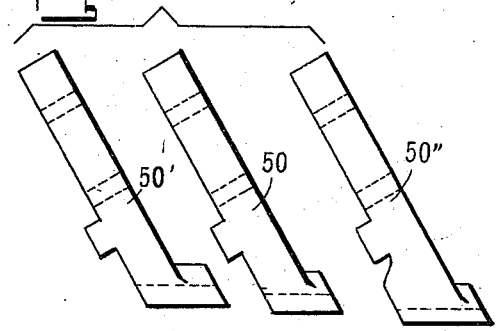
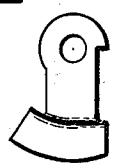
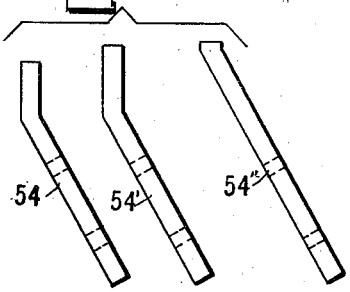
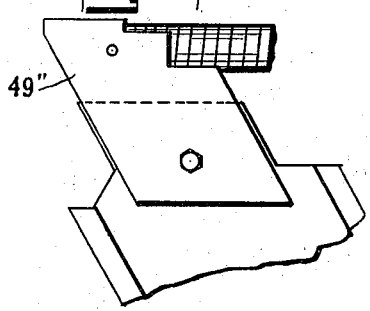
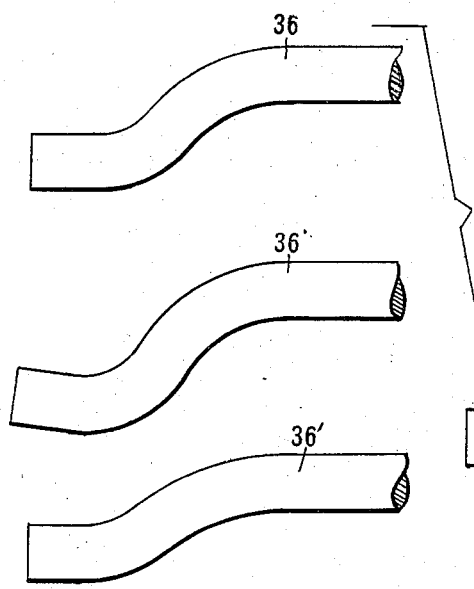
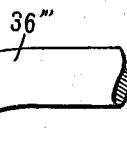
Witnesses
Frank A. Fable
Bertha M. Ballard
Inventor
William H. Johnson
By
Arthur M. Hood
Attorney
THE NORRIS PETERS CO., PHOTO-LITHO., WASHINGTON, D. C.

No. 727,959. Patented May 12, 1903.

UNITED STATES PATENT OFFICE.

WILLIAM H. JOHNSON, OF VEEDERSBURG, INDIANA.

BENDING-MACHINE.

SPECIFICATION forming part of Letters Patent No. 727,959, dated May 12, 1903.

Application filed December 12, 1901. Serial No. 85,714. (No model.)

*To all whom it may concern:*

Be it known that I, WILLIAM H. JOHNSON, a citizen of the United States, residing at Veedersburg, in the county of Fountain and State of Indiana, have invented a new and useful Bending-Machine, of which the following is a specification.

My invention relates to an improvement in means for bending wood or other similar material.

The object of my invention is to provide means for supporting the material during bending at the points of flexure, particularly on the convex sides; and to this end the fundamental feature of my invention consists in the production of a peculiar spring-support.

A further object of my invention is to provide a machine consisting of parts designed for the use of the peculiar spring mentioned.

A further object of my invention is to provide a removable clamp for holding the material in its bent position until the same has set without scarring the inside of the first or upper bend.

A further object of my invention is to provide such improvements in details of construction as shall be hereinafter described.

The accompanying drawings illustrate my invention in the form of a machine especially designed for bending shovel-handles.

Figure 1 is a front elevation with the parts in receiving position. Fig. 2 is a similar view with the parts in their positions at the time of first engagement with the handle, the upper portion of the holder being omitted, however. Fig. 3 is a similar view with the parts in their position at the time of completion of the bend and the complete holder in position. Fig. 4 is a similar view with the parts in their positions at the time of the discharge. Fig. 5 is a side elevation. Fig. 6 is an axial section of the bending-jaws and the anvil portion of the holder. Fig. 7 is a perspective view of the holder with the bent portion of a handle inserted. Fig. 8 is a perspective view of the holder. Fig. 9 is a perspective view of a backing-spring for cylindrical handles. Fig. 10 is a similar view of a spring for work of angular cross-section when the bend is to be given to a corner. Fig. 11 is a similar view of a spring for flat work. Fig. 12 is a similar view of a modified form of spring for cylindrical work. Fig. 13 is a side elevation of three different jaws 50, each for a different bend. Fig. 14 is a side elevation of three different rests 54. Fig. 15 is a side elevation of a substitute swinging jaw 45. Fig. 16 is a perspective view of a wedge to lie in socket 53. Fig. 17 is a side elevation of a substitute jaw 49. Fig. 18 is a side elevation of four different bends which the machine is capable of making.

My invention particularly resides in the backing-spring, (illustrated in Figs. 9 to 12, inclusive,) and in the holder. (Shown in Figs. 7 and 8.) The fundamental feature of the spring by which it is applicable for the purpose designed is the fact that by it I am able to produce a stack or series of laminæ which are held together in such manner that if a force be applied at opposite ends, so as to swing the end laminæ in planes at right angles to the axis of the spring and about an imaginary center outside of the spring, each intermediate lamina will assume a position substantially normal to an arc struck from the imaginary center and drawn between the faces of two end laminæ. When this spring is produced from a spiral, as shown in Figs. 9, 10, and 11, a portion of each coil or turn is bent out of its position until it conforms to that face of the article to be bent which lies in the plane of bend, and the ends of the operating-faces of the laminæ thus formed are connected to the opposite ends of the adjacent laminæ. The form shown in Figs. 9, 10, and 11 therefore consists of a coil of spring-bar 20, said bar appearing in the illustration as rectangular in cross-section, and a portion 21 of each turn is distorted from the original form, so as to assume the shape of one or more surfaces of the article to be bent. In the form shown in Fig. 12, however, the spring is made from a strip 22, of sheet metal, the said strip being doubled upon itself alternately in opposite directions, so as to form a zigzag pile or stack in which the laminæ are substantially parallel and connected each to the adjacent two at alternate ends. The surface formed at one edge of the stack is then reduced to a surface 23, which will conform to the article to be bent.

The wood to be bent by the use of a spring of the kind described is generally steamed or otherwise temporarily softened.

In Figs. 1 to 8, inclusive, I have shown mechanism particularly designed for the use of my peculiar spring for producing the ogee curve or bend usually found in shovel and scoop handles, the machine being designed also for the use of the peculiar holder shown in Figs. 7 and 8, one of which is attached to each handle after it has been bent and remains thereon until the wood has set in the new position. This holder is made in two parts, the first of which consists of an anvil 24, provided with a socket 25, which in transverse cross-section conforms with the cross-section of the handle to be bent and in longitudinal cross-section is given the curvature of the inside or concave side of the first bend of the ogee. The anvil 24 preferably is of a length equal to the arc to which the handle is to be brought, and by its use I am able to produce a bend which is not scarred at the point of bend. Projecting from anvil 24 is an arm 26, which carries at its outer end a finger 27, which lies transversely across the longitudinal axis of the socket 25 and at such distance and relation thereto as to be in position to receive the end of the handle beyond the second bend of the ogee on the convex side of the said second bend. The other piece of the holder consists of a bar 28, which lies parallel to the bar 26 and is provided with three transverse fingers 29, 30, and 31. Finger 29 is adapted to receive and support the anvil 24, while fingers 30 and 31 are arranged to engage that side of the handle opposite to that engaged by the anvil 24 and finger 27, the finger 31 passing beneath the arm 26 and engaging the handle at the point of the inside bend of the second or lower curve of the ogee, while the finger 30 engages the same side of the handle, but at a point in front of the first bend of the ogee.

The machine now to be described is built about or around two springs $a$ and $b$, such as that shown in Fig. 9, and is adapted to automatically attach the holder (shown in Figs. 7 and 8) when the handle is bent.

Forming part of the main frame of the machine is a face-plate 32, in which is formed a pair of guideways 33 and 34, the said guideways converging. Mounted at the lower end of the guideway 33 is a stationary jaw 35, with a socket 35', adapted to receive a handle 36. Reciprocably mounted in the guideway 33 is a head 37, which carries at its lower end a jaw 38, provided with a socket 39, the said jaw and socket being adapted to coöperate with the stationary jaw 35. Mounted in the same guideway 33 and parallel with the head 37 is a supplemental head 40, to which is attached one end of an operating-lever 41. A spring 42 is placed between jaw 38 and the supplemental head 40 in order to form a yielding connection therebetween.

Pivoted at 43 (see dotted lines, Fig. 6) to the inner end of jaw 38, so as to swing in a plane parallel to the axis of socket 39, is an arm 44, to the outer end of which is detachably bolted a swinging jaw 45. The lower end of jaw 45 is provided with a socket 46, the transverse section of which conforms with a portion of transverse section of the article to be bent and the longitudinal section of which conforms to the inside arc of the second curve of the ogee to be formed. The socket 46 of the swinging bending-jaw 45 lies the length of the convex side of the first curve of the ogee from the end of jaw 38, and this space is bridged by the backing-spring $a$, one end of said spring being attached to the end of jaw 38. The end lamina of the opposite or free end of spring $a$ is attached to a block 44', which lies in a groove 44'', formed in the end of arm 44. Block 44' is held in the groove 44'', so that it may move longitudinally therein, but so that the arm 44 may exert a downward pressure thereon by means of a link 44''', pivoted at one end to arm 44 and at the other end to block 44'. The attachment of spring $a$ is such that the end laminæ become substantially integral with the adjacent jaws 38 and 45.

Forming a continuation of the guide 34 below the line of the stationary jaw 35 is a guide 47, in which is reciprocably mounted a head 48. This head carries at its upper end a detachable jaw 49, which is adapted to receive the end of the handle immediately beyond the convex side of the second bend of the ogee. Jaw 49 coöperates with a similar jaw 50, which is detachably secured to the head 51, reciprocably mounted in the guideway 34 and arranged to be reciprocated by means of a lever 52, one end of which is pivoted to the head.

Formed at the inner end of the stationary jaw 35 is a socket 53, which is adapted to receive the anvil 24 of any one of the holders, the said socket being of such form and arrangement as to hold the anvil in position where the socket 25 thereof will form a continuation of the socket 35' of the stationary jaw. The finger 27 of this part of the holder is supported by a stationary support 54 in position to receive the end of the handle when it has been brought to its final bent position. Formed in the bottom of the socket 53 is a groove 55, adapted to receive finger 29 of the holder, and formed in the movable jaw 38 is a transverse slot 56, into which finger 30 of the holder may be projected. The jaw 49 engages the handle beyond the convex side of the second curve of the ogee, and the spring $b$ therefore is attached at one end to the inside end of the jaw 49, while the opposite or free end extends toward the adjacent end of the anvil 24. This free end of the spring $b$ is engaged by the upper hooked end of link 57, the lower end of which may be attached at any one of a number of points 58 to one arm of a lever 59, which is pivoted at 60 to the main frame of the machine. The opposite arm of the lever 59 is engaged by the tension-spring 61, which normally urges the link 57 upward and brings lever 59 against a stop 59'.

Pivoted to the lower end of head 48 is a link 62, the lower end of which is pivoted to lever 63, provided at its outer end with a counterweight 64, which normally tends to raise the sliding head 48 upward. Link 62 carries a finger 62', adapted to engage the end of one arm of lever 59, for a purpose which will appear. Pivoted to the short arm of lever 63 is the upper end of a link 65, to the lower end of which is pivoted at any one of a number of points 66 a lever 67, which is pivoted to the main frame at 68. Lever 67 carries a lug 69, which is adapted to be engaged by a cam 70, provided with two eccentric portions 71 and 72 and a concentric portion 73. Cam 70 is carried by the main driving-shaft 74.

In order that the handle may more readily stay bent, it has been found that a certain amount of upsetting—i. e., longitudinal distortion—of the handle is advisable, and for this purpose I provide a head 75, the shank 76 of which is reciprocated in a bearing 77, carried by the head 51, the line of reciprocation being parallel to the line of movement of the head 51. Detachably secured to the head 75 is a block 78, which lies beneath jaw 50. Shank 76 is provided at its upper end with a projection 79, which is normally held in engagement with a stationary stop 80 by a spring 81, one end of said spring being attached to the shank 76, while the other is attached to a hook 82, carried by head 51, the arrangement being such that when projection 79 is in engagement with stop 80 block 78 is in alinement with socket 35' of the stationary jaw 35, the said block being of the same size and shape as the end of the handle 36. Secured to the bearing 77 by bolts 83 is a finger 84, which is thereby longitudinally adjustable with relation to the bearing. Finger 84 is adapted to engage a shoulder 75' of the head 75, and thereby limit the movement of this head in the head 51. The swinging jaw 45 is normally urged upward, so that the spring $a$ will lie in alinement with socket 39 of jaw 38 by means of a spring 85, one end of which is attached to arm 44 and the other end of which is attached to the supplemental head 40.

Pivoted to the upper end of the swinging jaw 45 is a hollow link 86, within which is slidably mounted a pin 87, (shown in dotted lines in Fig. 1,) which is provided with a shoulder 88, adapted to engage the free end of the hollow link. The upper end of pin 87 is pivoted to the knee of the bell-crank lever 89, one arm of which is pivoted at 90 to a projection 51', forming a part of the head 51. Lever 89, pin 87, and link 86 form a toggle-lever connection between head 51 and the end of the swinging jaw 45, and the toggle is broken or released by bringing arm 89' of the bell-crank lever into engagement with a stationary projecting pin 91, carried by the face-plate 32.

After the handle has been bent and before the second portion of the holder can be brought into engagement with the bent handle it is necessary to slightly withdraw the swinging jaw 45 from engagement with the handle in order that finger 31 may be slipped over the handle at the inside of the second bend. This withdrawal is accomplished by breaking the toggle already described; but in order to prevent the swinging jaw from being swung upward too far by the spring 85 I mount in head 51 a shaft, to the outer end of which is secured an arm 92. Pivoted to the free outer end of arm 92 is a link 93, which is provided at its lower end with a slot 94, (see dotted lines in Figs. 1 and 3,) which receives a pin 95, carried by the back side of the swinging arm 44. Secured to the rear end of the shaft which carries arm 92 is an arm 96, (see dotted lines in Fig. 3,) to the outer end of which is secured one end of a spring 97, the opposite end being secured to a rod 98, which is passed up through an opening in the cross-arm 34' of the guide 34 and provided at its outer end with a head 99.

In order to automatically place the second piece of the holder upon the bent handle, I provide a shaft 100, which is reciprocable through the face of the machine and is provided at its outer end with two fingers 101, which are adapted to engage the ends of the bar 29 of the second piece of the holder. Shaft 100 is reciprocated by means of a lever 102, the lower end of which is engaged by a cam 103, carried by the main shaft 74. Shaft 100 carries a collar 104, between which and the upper end of the arm 102 is inserted a spring 105, which allows the holder to be attached to the handles at a uniform pressure in spite of any slight differences in diameter of the handle. The fingers 101 are normally held in the outer position (shown in Fig. 5) by means of a spring 106, acting upon the lever 102.

Levers 41 and 52 are swung in proper time by suitable cams 107 and 108, respectively, which are carried by the main shaft 74.

In order to support the outer end of the handle 36, (not shown,) I secure to the main frame a support 109, which is provided at its outer end with a suitable guide 110, adapted to engage the outer end of the handle.

In receiving position the jaw 49 is held in alinement with the stationary jaw 35 and with the block 78 by the counterweight 64, resting upon the stationary support 111.

In operation the parts are normally in the position shown in Fig. 1, in which jaw 49 and the attached spring $b$ are in alinement with jaw 35. Block 78 is also in alinement with said jaw. Jaw 50 has been to a greater or less extend drawn upward away from the block 78, the distance being equal to the distance between shoulder 75' of head 75 and the end of the finger 84, and jaw 38, the swinging jaw 35, and spring $a$ are drawn upward by levers 41 and 52. The anvil portion 24

26 27 of the holder is then placed in position, anvil 24 lying in socket 53 and finger 27 resting upon stop 54. The second part of the holder is then placed with its finger 29 in the supplemental socket 55 beneath the anvil 24. Fingers 30 and 31 lie out of line of socket 35' of jaw 35; but finger 30 lies vertically below slot 56 and finger 31 lies immediately below the middle of arm 26. A handle which has been previously softened by steam or otherwise is then laid in the socket 35', extending across the anvil 24, spring b, and jaw 49, and abutting against block 78. Shaft 74 is then set in rotation in the direction indicated by the arrow and lever 41 throws jaw 38 downward into engagement with the handle, spring 42 being compressed by this movement and the pressure being sufficient to clamp the handle and hold it against either endwise or rotative displacement. Lever 52 also throws head 51 down until jaw 50 comes into engagement with the handle and finger 84 is brought into engagement with shoulder 75' of the head 75. The relative movement of heads 37 and 51 up to this point is such that the toggle formed by link 86, pin 87, and lever 89 is straightened out, so that the outer end of pin 87 is thrown under the projection 51' of head 51, so as to form a direct thrust connection between the head 51 and the swinging jaw 45. The parts are then in the position shown in Fig. 2. As shaft 74 advances cam 107 holds lever 41 still, so as to securely clamp handle between jaws 35 and 38, while cam 108 continues to swing lever 52 so as to force head 51 downward. This movement also forces jaw 49 and head 48 downward against the action of the counterweight 64, so as to force the inner end of the handle downward, bending the handle around the anvil 24. Surface 72 of cam 70 also serves to draw head 48 downward against the action of counterweight 64. At the same time the positive connection between head 51 and the swinging jaw 45 produces a kink in the handle at the point of contact of the jaw 45, so that the handle is also bent into the form of the swinging jaw, and the extreme inner end of the handle is brought down into engagement with the finger 27 of the holder. During this action the end laminæ of the spring a are swung and each lamina of the spring assumes a position at all times normal to the bending handle along the first convex curve, thus supporting the fibers at all points and preventing them from breaking loose from the body of the handle. The connection 44' 44'' 44''' between the free end of the spring a and the jaw 45 allows for a slight relative movement, so as to compensate for variations in the length of the spring due to its distortion. During the downward movement of head 48 the spring b operates to support the fibers of the outside of the second curve of the ogee curve of the handle in the same manner as spring a operates, the end laminæ being shifted by the relative movement of head 48 and link 57. Block 78 is held in continuous engagement with the end of the handle and, moving as it does toward the upper end of the handle as it moves downward, exerts a continuous axial or longitudinal pressure upon the end of the handle, which is resisted by the clamping of the jaws 35 and 38, so that there is a resultant upsetting or endwise displacement of the fiber of the wood, thus aiding a permanent set of the fiber in the bent position. Just before the inner end of the handle is brought down to the finger 27 of the holder the arm 89' of lever 89 is brought into contact with the stop 91 and said stop swings the lever about its pivot 90, so as to break the toggle and allow spring 85 to draw jaw 45 away from the handle slightly, as shown in Fig. 3, the amount of withdrawal being regulated by the movement of pin 95 in slot 94 of the link 93, spring 97 taking up the shock, so as to prevent undue noise. The withdrawal of the swinging jaw 45 is only sufficient to allow the insertion of finger 31 of the holder over the second inside curve of the handle, and by this time shaft 74 has advanced so as to bring cam 103 into engagement with lever 102, which lever operates to draw shaft 100 inward, so that its fingers 101 will force fingers 30 and 31 of the second portion of the holder over the bent handle in the manner shown in Fig. 7, so as to hold the handle in its bent position until it sets. As head 48 is forced downward counterweight 64 is raised from its support 111 and finger 62' of link 62 is brought into engagement with lever 59, so that when the head is in its lower position it will hold link 57 down, so as to prevent spring 61 from forcing said link upward. After the holder has been attached to the bent handle a continued rotation of shaft 74 causes a reverse movement of levers 52 and 41 until the parts are brought into the position shown in Fig. 4, the head 48 being held down against the action of the counterweight by the concentric portion 73 of the cam 70, thus leaving a large opening between the jaws, from which the bent handle, with its attached holder, may be readily withdrawn. The counterweight 64 operates to return head 48 and attached parts to the initial position as soon as part 71 of the cam 70 is brought opposite lug 69 of lever 67, and the parts are then in initial position and the operation may be repeated.

In order that the machine may produce bends of different sizes, such as those shown in Fig. 18, I provide several different jaws 50 50' 50'', which vary in length of projection below bearing 77; different stops 54 54' 54'', by which the height of the support for finger 27 of the holder may be regulated; a second jaw 45', which may be substituted for the jaw 45, and in which the socket 46' is formed upon a longer curve than the socket of the jaw 45; a second jaw 49'', which is longer than the jaw 49 and may be substituted therefor; a shim or thin wedge 53'', which may be inserted in socket 53, so as to change the angle of the anvil 24 of the holders with relation to the jaw 35, and block 78 is made removable, so that when desired the end of the handle may be caused to come into direct engagement with the head 75. The effective throw of cam 70 may be then altered by shifting the point of connection of lever 67 to link 65 from one hole 66 to another. A similar adjustment for link 67 may be produced by shifting its connection with lever 59 to another hole 58. The throw of head 51 is always uniform; but by changing the length of jaw 50 the jaw may be brought sooner or later into contact with the handle and its lowest point and the consequent distortion of the end of the handle will vary accordingly. Finger 84 is adjusted upon bearing 77 so that it will come into engagement with shoulder 75' of head 75 as soon as jaw 50 comes into engagement with the handle. By this substitution of easily-detachable parts and changing effective lengths of levers and links I am able to make bends of different sizes on one machine without altering the cams, which could not be readily changed, and without changing the throw of head 51.

I claim as my invention—

1. In a bending-machine, a backing-spring consisting of a plurality of yieldingly-connected laminæ each adapted to engage the bending-face of an article to be bent.

2. In a bending-machine, a backing-spring consisting of a plurality of yieldingly-connected laminæ, one edge of each lamina being formed to receive the article to be bent.

3. In a bending-machine, a backing-spring consisting of a coil or helix having a portion of each turn displaced so as to form a surface fitting a portion of the article to be bent.

4. In a bending-machine, the combination of a grasping means between which a portion of the article to be bent may be grasped, a second grasping means between which another portion of the article to be bent may be grasped, said second grasping means consisting of a pair of independent sliding jaws, means for bringing said jaws together upon the article to be bent and for simultaneously moving said jaws with relation to the first-mentioned grasping means both transversely and longitudinally of the article to be bent.

5. In a bending-machine, the combination of a grasping means between which a portion of the article to be bent may be grasped, a second grasping means between which another portion of the article to be bent may be grasped, said second grasping means consisting of a pair of independent jaws slidable upon a line at an obtuse angle to the axis of the article to be bent, and means for bringing said jaws together upon the article to be bent and for sliding said jaws simultaneously with the article to be bent whereby one portion of the article will be moved simultaneously both transversely and longitudinally with relation to the original axis of the article.

6. In a bending-machine, the combination of means for holding the article to be bent, a swinging jaw, means for bringing said swinging jaw into engagement with the article so as to deflect the article transversely from its original position, and a backing-spring consisting of a series of yieldingly-connected laminæ adapted to engage the article to be bent, the end laminæ being secured to the holding means and swinging jaw.

7. In a bending-machine, the combination of a receiving-jaw, a reciprocating receiving-jaw coacting therewith, a swinging jaw pivoted to the reciprocating receiving-jaw, a pair of coacting reciprocating bending-jaws, means for reciprocating said bending-jaws along a line at an angle to the axis of the receiving-jaws, and a connection between the swinging jaw and one of the bending-jaws.

8. In a bending-machine, the combination of a receiving-jaw, a reciprocating jaw coacting therewith, a swinging jaw pivoted to the reciprocating receiving-jaw, a series of yieldingly-connected laminæ bridging the space between the reciprocating receiving-jaw and the swinging jaw and having its end laminæ attached to said jaws, an anvil arranged to coact with said series of laminæ, a pair of coacting reciprocating bending-jaws, a connection between the swinging jaw and one of the bending-jaws, a second series of yieldingly-connected laminæ arranged to coact with the swinging jaw and having one end lamina attached to the other reciprocating bending-jaw, means for yieldingly supporting the other end of the second series of laminæ, and means for reciprocating the bending-jaws.

9. In a bending-machine, the combination of a receiving-jaw, a reciprocating jaw coacting therewith, a swinging jaw pivoted to the reciprocating receiving-jaw, a series of yieldingly-connected laminæ bridging the space between the reciprocating receiving-jaw and the swinging jaw and having its end laminæ attached to said jaws, an anvil arranged to coact with said series of laminæ, a pair of coacting reciprocating bending-jaws, a connection between the swinging jaw and one of the bending-jaws, a second series of yieldingly-connected laminæ arranged to coact with the swinging jaw and having one end lamina attached to the other reciprocating bending-jaw, means for maintaining the other end of the second series of laminæ in engagement with the bending article, and means for reciprocating the bending-jaws.

10. In a bending-machine, the combination of a receiving-jaw, a reciprocating receiving-jaw coacting therewith, a swinging jaw pivoted to the reciprocating receiving-jaw, a backing-spring consisting of a series of yieldingly-connected laminæ bridging the space between the reciprocating receiving-jaw and the swinging jaw and having its end laminæ attached to said jaws, an anvil arranged to coact with said spring, a pair of coacting reciprocating bending-jaws, a toggle connection between one of said bending-jaws and the swinging jaw, a second backing-spring arranged to coact with the swinging jaw and having one end attached to the other bending-jaw, means for yieldingly supporting the other end of the second backing-spring, means for reciprocating the bending-jaws, and means for breaking the toggle connection at the completion of the bend so as to withdraw the swinging jaw slightly from the bent material.

11. In a bending-machine, the combination of receiving-jaws between which one portion of the article may be grasped, bending-jaws between which another portion of the article may be grasped, means for reciprocating said bending-jaws along a line extending at an obtuse angle toward the receiving-jaws, and a block carried by the bending-jaws and arranged to engage the end of the material to be bent and exert a longitudinal pressure thereon.

12. A holder for bent material consisting of, an anvil approximating in transverse section a portion of the transverse section of the article to be bent and in longitudinal section corresponding to the inner curve to which the article is to be brought; and a bar carrying a series of fingers to engage the bent material and the anvil upon opposite sides so as to clamp the anvil and bent material together.

13. A holder for ogee curves consisting of an anvil approximating in transverse section a portion of the transverse section of the article to be bent and conforming in longitudinal section to one of the inside curves to which the article is to be brought, a transverse finger carried by said anvil and adapted to engage the bent material upon the same side as the anvil, and a pair of fingers adapted to be projected into engagement with the handle at each end of the anvil in opposition to the anvil.

14. A holder for ogee curves consisting of two parts; the first of said parts consisting of an anvil 24 having a socket 25 approximating in transverse section a portion of the transverse section of the article to be bent and in longitudinal section conforming to an inside curve to which the article is to be bent, an arm 26, and a transverse finger 27; and the second of said parts consisting of an arm 28 carrying three transverse fingers 29, 30, and 31, substantially as and for the purpose set forth.

WILLIAM H. JOHNSON.

Witnesses:
 ARTHUR M. HOOD,
 BERTHA M. BALLARD.